UNITED STATES PATENT OFFICE 2,361,028

PROCESS OF FILTERING EGGS

James Milton Hansen, Chicago, Ill.

No Drawing. Application March 24, 1941,
Serial No. 384,955

2 Claims. (Cl. 99—113)

The present invention relates to a method of removing undesirable materials from egg liquids. When the liquids, that is, whites and yolks, of eggs are removed from the shells they may contain pieces of the shells, blood, meat and liver spots, etc. They contain the chalazae of the eggs which are objectionable because of their hard stringy nature.

The chalaza is intimately associated with the white of the egg and that part of the white immediately around the chalaza appears to be of a more viscous nature than other parts thereof. I have found that all egg liquids such as whole eggs, egg yolks and egg whites are more satisfactory to the baking and confectionary trade if they can be separated from the undesirable materials above mentioned with little disturbance of the natural interconnection that exists between different parts thereof.

It is the purpose of my invention to provide a novel method of filtering out the undesirable materials which by nature are extraneous, the method being characterized by the fact that the body of the egg liquid is maintained in a thicker and more desirable form than has heretofore been possible. My method also enables me to strip the thicker chalaza attached part of the egg white from the chalaza without breaking it up and without chopping up the chalaza and other extraneous material into fine particles that may be carried along with the desired parts of the egg.

My method of filtering out the undesirable materials from the egg meats is applicable to both whites and yolks, together or individually, whether or not they contain added ingredients. It applies to eggs that are to be frozen and to those that are to be used fresh. The advantages are more noticeable in the egg whites alone but are nevertheless important with egg yolks alone and with the whole egg meat product. I find that whole eggs, when processed and frozen and aged for a few weeks, are of much thicker nature. The aged product appears to be uniform throughout like custard and of considerably greater viscosity than eggs that have been screened and mixed in some churning operation before ageing.

Specifically my method comprises the passing of the egg meats through an elongated narrow passage, the total cross-sectional area of which is ample to enable a substantial part of an egg meat to flatten out and pass through the passage without being broken up. One dimension of the passage is such that a hard body of the thickness of chalaza cannot pass through it. In other words, the egg meat is flattened into layers of less thickness than the chalaza and caused to flow away from the chalaza. A preferred form of device for carrying out my method is illustrated in my application Serial No. 329,754 filed April 15, 1940. I find that when the egg meat is allowed to flow away from the chalaza in a flattened body the tendency of the egg white to stay together causes the more viscous part of the white to gradually strip away from the chalaza. Thus I am able to strip away substantially all of the useable egg white from the chalaza with no appreciable breaking up of the chalaza so it would pass through the restricted passage with the egg meats. Obviously the shell particles and other undesirable particles of substantial thickness cannot travel with the thin flattened layers of egg meats and will be left behind with the chalaza.

I am aware that egg meats have been strained through screens either with or without pressure. Some devices embodying screens are provided with means to remove the chalaza and other debris from the screen. Other devices provide means for cutting up the chalaza into fine particles that will pass the screen. My process differs from such processes in that it keeps the egg liquid in a more viscous state and does not break it up into minute pieces the size of the perforations.

In the practice of my method I prefer to use apparatus wherein the weight of the egg liquid itself draws the heavier material attached to the chalaza away from it. I also prefer to avoid sharp cutting edges at the entrances to the narrow passages for the egg liquid because such edges will cause more of a cutting action upon the connection of the egg white to the chalaza and less of the preferred stripping action. As shown in my application hereinbefore identified I wipe the chalaza from the passages at frequent intervals to permit free flow of the egg liquid through the passages. Chalaza, blood and liver spots, yolk sacs and shell particles are evidently heavier and more dense than the egg liquid. They settle downward in the liquid when wiped from the passages.

It is advantageous in a gravity separation to arrange the narrow passages or slots so that the weight of the egg liquid passing through the passages tends to cause the egg liquid and chalaza, etc., to travel lengthwise of the elongated openings because better stripping of the whites appears to result. Where the egg liquids are pressed upwardly through the narrow passages the chalaza by its own weight aids in keeping the passages free. I have found that the narrow dimensions of the passages should be in the neighborhood of 12/1000 inch to 22/1000 inch. Wider passages may be used but the quality is sacrificed if the passages are made wide enough to pass the smaller chalaza, etc., and egg shell particles. The length of the openings is such as to provide ample area to pass the meats. Longer openings provide greater capacity per passage. If I use passages 20/1000 inch wide by 12½ inches long each passage provides ¼ square inch of cross sectional area.

While I have described certain detailed features of the preferred manner of carrying out my process it is to be understood that my invention in its broader aspects is not limited to such details.

Having thus described my invention what I claim as new and desire to secure by Letters Patent is:

1. A process of filtering egg meats which comprises flowing them in flattened form while substantially maintaining the natural adherence of the particles of the individual egg meats to each other through a passage one cross sectional dimension of which is too small to pass the chalaza and the other cross sectional dimension of which is many times that necessary to pass the chalaza.

2. The method of stripping egg whites from the chalaza which comprises catching the chalaza between two opposed walls of a passage narrower than the smallest dimension of the chalaza, the cross section of the passage being of the order of ¼ inch so that it is ample to freely pass the egg whites, and flowing the whites by their own weight away from the chalaza.

JAMES MILTON HANSEN.